United States Patent
Wei

(10) Patent No.: US 10,556,550 B2
(45) Date of Patent: Feb. 11, 2020

(54) TERMINAL MOUNTING SUPPORT

(71) Applicants: BOE TECHNOLOGY GROUP CO., LTD., Beijing (CN); BEIJING BOE SPECIAL DISPLAY TECHNOLOGY CO., LTD., Beijing (CN)

(72) Inventor: Chengbin Wei, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/030,538

(22) Filed: Jul. 9, 2018

(65) Prior Publication Data

US 2019/0047485 A1     Feb. 14, 2019

(30) Foreign Application Priority Data

Aug. 11, 2017   (CN) .......................... 2017 2 1004738

(51) Int. Cl.
*B60R 11/02* (2006.01)
*B60R 11/00* (2006.01)

(52) U.S. Cl.
CPC ... *B60R 11/0229* (2013.01); *B60R 2011/0052* (2013.01)

(58) Field of Classification Search
USPC ....................................................... 248/636
See application file for complete search history.

(56) References Cited

U.S. PATENT DOCUMENTS

| | | | | | |
|---|---|---|---|---|---|
| 320,436 | A | * | 6/1885 | Hock | A47L 13/24 15/144.2 |
| 2,425,033 | A | * | 8/1947 | Fletcher | F16L 3/227 248/68.1 |
| 3,186,051 | A | * | 6/1965 | Waddell | F16L 3/222 174/135 |
| 3,564,676 | A | * | 2/1971 | Oeser | F16L 3/1016 24/279 |
| 3,606,218 | A | * | 9/1971 | Enlund et al. | F16L 3/1091 248/74.2 |
| 4,530,478 | A | * | 7/1985 | McClellan | F16L 59/135 138/106 |
| 4,784,363 | A | * | 11/1988 | Brown | F16L 55/035 248/610 |
| 4,787,583 | A | * | 11/1988 | Morton | F16L 1/026 248/55 |

(Continued)

*Primary Examiner* — Monica E Millner
(74) *Attorney, Agent, or Firm* — Westman, Champlin & Koehler, P.A.

(57) ABSTRACT

A terminal mounting support is provided. The terminal mounting support is adapted to fix a terminal onto a fixing member, the terminal mounting support includes: a first support and a second support oppositely arranged, wherein the first support is fixedly connected to the second support, and at least one of the first support and the second support is provided with a connection structure for being fixedly connected to the terminal; and a first buffer material layer arranged between the first support and the second support, wherein an accommodation space for accommodating at least a portion of the fixing member is formed in the first buffer material layer.

20 Claims, 2 Drawing Sheets

(56) References Cited

U.S. PATENT DOCUMENTS

| | | | | |
|---|---|---|---|---|
| 4,804,158 A * | 2/1989 | Collins | ............... | F16L 59/135 |
| | | | | 248/74.4 |
| 4,941,481 A * | 7/1990 | Wagenknecht | ........ | A61B 17/62 |
| | | | | 403/373 |
| 5,112,031 A * | 5/1992 | Hynds | ............... | B60G 21/0551 |
| | | | | 248/222.12 |
| 5,226,892 A * | 7/1993 | Boswell | ............. | A61M 5/1418 |
| | | | | 128/DIG. 26 |
| 5,270,911 A * | 12/1993 | Maglica | .................... | B62J 6/00 |
| | | | | 248/288.51 |
| 5,815,894 A * | 10/1998 | Soriano | ................. | A01K 97/08 |
| | | | | 24/510 |
| 6,460,231 B2 * | 10/2002 | Bourgerie | ............. | A01K 97/08 |
| | | | | 24/487 |
| 8,313,065 B2 * | 11/2012 | Birch | ................... | F16L 3/1016 |
| | | | | 138/149 |
| 9,038,968 B2 * | 5/2015 | Hennon | ............... | F16L 3/1091 |
| | | | | 248/65 |
| 9,492,638 B2 * | 11/2016 | McKinnis | ............... | A61B 8/12 |
| 9,562,645 B2 * | 2/2017 | Wu | ..................... | F16M 13/027 |
| 9,835,271 B2 * | 12/2017 | Olsen | ........................ | F16B 2/06 |
| 9,976,592 B2 * | 5/2018 | Naphade | ................ | F16C 1/102 |
| 10,012,261 B2 * | 7/2018 | Jungeberg | ........... | F16C 11/0604 |
| 2002/0104930 A1 * | 8/2002 | Attee | ...................... | F16B 2/065 |
| | | | | 248/74.1 |
| 2005/0061925 A1 * | 3/2005 | Kirschner | ............ | F16L 3/1016 |
| | | | | 248/49 |
| 2012/0256416 A1 * | 10/2012 | Ikeda | ..................... | F16L 17/04 |
| | | | | 285/365 |

* cited by examiner

TERMINAL MOUNTING SUPPORT

CROSS-REFERENCE TO RELATED APPLICATION

This application claims a priority to Chinese patent Application No. 201721004738.0, filed with the Chinese State Intellectual Property Office on Aug. 11, 2017, which is incorporated herein by reference in its entirety.

TECHNICAL FIELD

The present disclosure relates to the technical field of the mounting of vehicle-mounted display terminals, and in particular, to a terminal mounting support.

BACKGROUND

Currently, vehicle-mounted display terminals are widely used in the market, and the vehicle-mounted display terminals are usually fixed by a mounting rod. When vibration is generated on a vehicle, the vibration is directly transmitted to act on the display terminal, and the display terminal is easily damaged in a long-term vibration and impact environment.

Therefore, since the vehicle-mounted display terminal is exposed to vibration for a long period of time, how to avoid the influence of the vibration on the display terminal becomes an inevitable problem that needs to be solved in the installation and fixation of the vehicle-mounted display terminal.

SUMMARY

A terminal mounting support is provided according to embodiments of the present disclosure, which is adapted to fix a terminal onto a fixing member, and the terminal mounting support includes:

a first support and a second support oppositely arranged, wherein the first support is fixedly connected to the second support, and at least one of the first support and the second support is provided with a connection structure for being fixedly connected to the terminal; and a first buffer material layer arranged between the first support and the second support, wherein an accommodation space for accommodating at least a portion of the fixing member is formed in the first buffer material layer.

Optionally, the terminal mounting support further includes:

a second buffer material layer arranged on a side of the second support away from the first support, wherein one side of the second buffer material layer is fixedly connected to the second support, and the other side of the second buffer material layer is provided with a positioning mounting surface to be attached to the terminal.

Optionally, the accommodation space is a via hole structure formed in the first buffer material layer and penetrating a first end surface and a second end surface of the first buffer material layer opposite to each other.

Optionally, the shape and size of the accommodation space are matched with the shape and size of the portion of the fixing member arranged in the accommodation space to make the fixing member be tightly held in the accommodation space.

Optionally, the first support includes a first curved portion, the second support includes a second curved portion arranged opposite to the first curved portion, and the first curved portion and the second curved portion each is arranged around the accommodation space.

Optionally, the accommodation space is of a cylindrical shape.

Optionally, the first buffer material layer is provided with a first mounting hole communicating with the accommodation space, and the first support is provided with a second mounting hole corresponding to the first mounting hole, and the first mounting hole and the second mounting hole are connected using a first screw.

Optionally, the connection structure includes a first protrusion arranged on an end surface of the second support facing the first support, the first buffer material layer and the first support each is provided with a via hole matched with the first protrusion; and the first portion of the first protrusion sequentially passes through the via hole of the first buffer material layer and the via hole of the first support, extends out of the first support and is fixedly connected to the first support.

Optionally, the connection structure further includes a second protrusion arranged on an end surface of the first support away from the second support, and the second protrusion is connected to the first portion of the first protrusion using a second screw to fixedly connect the first support to the second support.

Optionally, the first support, the second support and the first buffer material layer each is provided with a third mounting hole into which a screw is threaded, and the connection structure further includes a third screw penetrating the first support, the second support and the first buffer material layer, and connected to the third mounting hole.

Optionally, the first buffer material layer is further provided with a notch extending from the first end surface to the second end surface, and the notch communicates with the accommodation space.

Optionally, the first support further includes the first support further comprises a first flat plate portion and a second flat plate portion respectively extending from two sides of the first curved portion, a third flat plate portion connected to the first flat plate portion, and a fourth flat plate portion connected to the second flat plate portion, the first flat plate portion and the second flat plate portion are symmetrical with respect to the first curved portion, the third flat plate portion and the fourth flat plate portion are arranged along a same plane and respectively located in planes different from the first flat plate portion and the second flat plate portion, and an angle is formed between the first flat plate portion and the second flat plate portion.

Optionally, the second support further comprises a fifth flat plate portion and a sixth flat plate portion extending respectively from two sides of the second curved portion, a seventh flat plate portion connected to the fifth flat plate portion, and an eighth flat plate portion connected to the sixth flat plate portion, the fifth flat plate portion and the sixth flat plate portion are symmetrical with respect to the second curved portion, the seventh flat plate portion and the eighth plate portion are arranged along a same plane and respectively located in planes different from the fifth plate portion and the sixth plate portion, and an angle is formed between the fifth plate portion and the sixth plate portion.

Optionally, the first support and the second support each has a ⋎ shape.

Optionally, the first protrusion is perpendicular to the end surface of the first support, and the second protrusion is perpendicular to the end surface of the first support.

Optionally, the first buffer material layer and the second buffer material layer each is made of a silica gel material.

Optionally, the first support and the second support each is made by means of the sheet metal bending process.

DETAILED DESCRIPTION

Hereinafter, the technical solutions in embodiments of the present disclosure are described clearly and completely in conjunction with the drawings of the embodiments of the present disclosure. It is apparent that the described embodiments are only a part of embodiments of the present disclosure. Other embodiments obtained by those skilled in the art on the basis of the embodiments of the present present disclosure without creative work fall into the scope of protection of the present disclosure.

Figure 1:
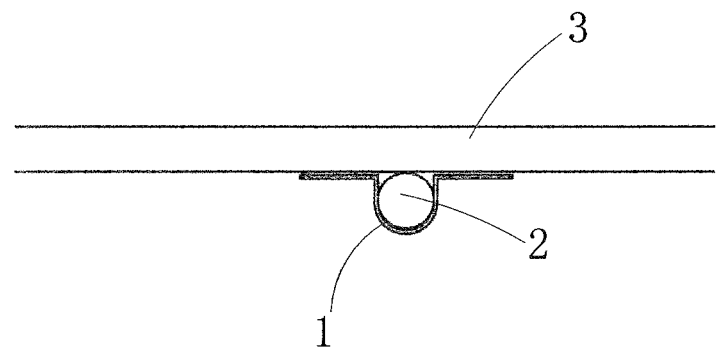
FIG. 1 is a schematic diagram of a mounting structure of a vehicle-mounted display terminal in the related art.

As shown in FIG. 1, the mounting support 1 covers around a periphery of the vehicle-mounted mounting rod 2, and fixedly connected to the display terminal 3 using screws to fix the display terminal 3. However, if the fixed mounting method is adopted for the display terminal 3, vibration is directly transmitted to act on the display terminal when the vibration is generated externally. Under a vibration and impact environment for a long time, the display terminal is prone to have problems such as bright lines, dark lines, dark spots, and friction traces, and defects such as the splintering and membrane scratching of the liquid crystal module may even be caused. An objective of the technical solution of the present present disclosure is to provide a terminal mounting support so as to improve the vibration absorption performance when the terminal is installed.

Figure 2:
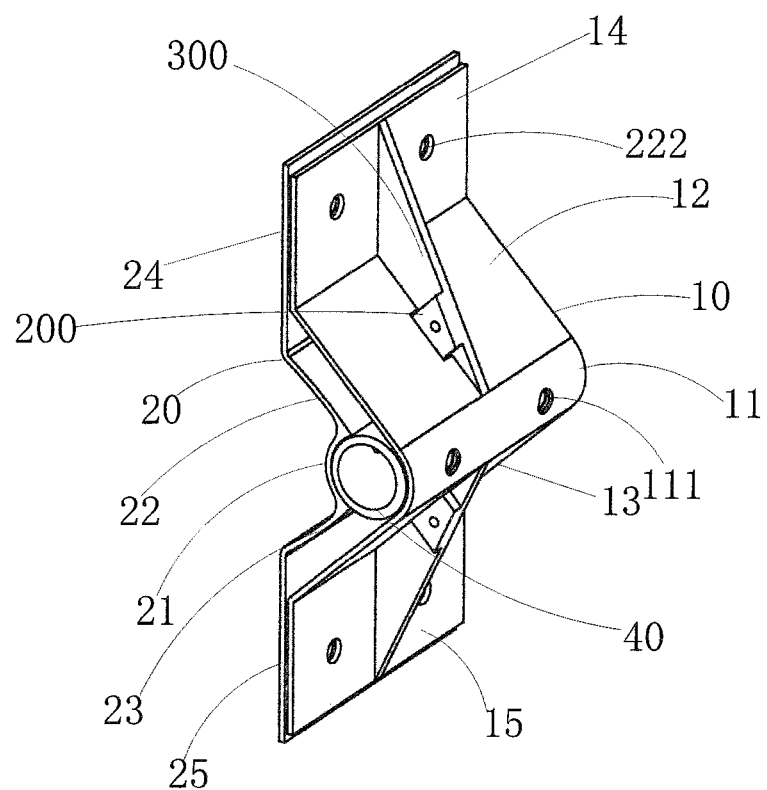
FIG. 2 is a structural schematic diagram of a part of a terminal mounting support according to some embodiments of the present disclosure.
Figure 3:
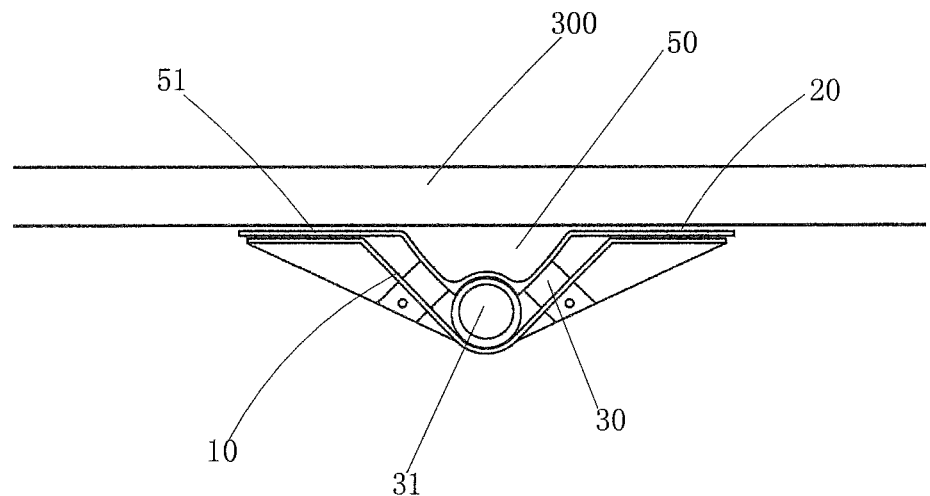
FIG. 3 is a schematic structural plan view of a terminal mounting support applied to the terminal installation according to some embodiments of the present present disclosure.
Figure 4:
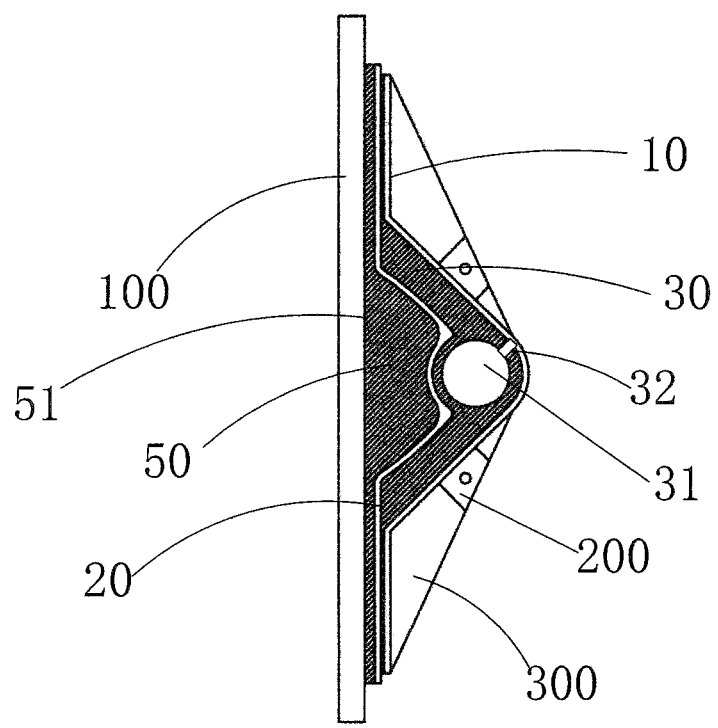
FIG. 4 is a schematic structural plan view of a terminal mounting support applied to the terminal installation according to some embodiments of the present present disclosure.

A terminal mounting support is provided according to some embodiments of the present disclosure, as shown in FIG. 2 to FIG. 4. The terminal mounting support includes: a first support 10 and a second support 20 oppositely arranged, wherein the first support 10 is fixedly connected to the second support 20, and the first support 10 and/or the second support 20 is provided with a connection structure for being fixedly connected to the terminal; and a first buffer material layer 30 arranged between the first support 10 and the second support 20, wherein an accommodation space 31 for accommodating at least a portion of the fixing member 40 is formed in the first buffer material layer 30.

The terminal mounting support according to some embodiments of the present disclosure is used to fix the terminal onto the fixing member 40, the fixing member 40 is arranged in the first buffer material layer 30 between the first support 10 and the second support 20, the first buffer material layer 30 is used to decompose and absorb the vibration force generated when the fixing member 40 is vibrated, achieving the vibration absorption effect, and therefore, the vibration force transmitted from the fixing member 40 to the terminal is weakened to protect the fixed terminal.

In the embodiments of the present disclosure, as shown in FIG. 2 to FIG. 4, the first buffer material layer 30 may fill the space between the first support 10 and the second support 20 in a form of multiple blocks of buffer material, or may also be set as a whole. Specifically, in a case that the first buffer material layer 30 includes multiple blocks of buffer material, the multiple blocks of buffer material are arranged around the fixing member 40 to form the accommodation space 31.

Referring to FIG. 3 and FIG. 4, in a case that the first buffer material layer 30 is arranged as a whole, the accommodation space 31 of the first buffer material layer 30 is formed to be a via hole structure penetrating a first end surface and a second end surface opposite to each other, and the shape and size of the accommodation space 31 are matched with the shape and size of the portion of the fixing member 40 so that the fixing member 40 is tightly held in the accommodation space 31. Optionally, the accommodation space 31 may be seamlessly matched with the fixing member 40. In an embodiment of the present disclosure, the portion of the fixing member 40 arranged in the accommodation space 31 has a cylindrical structure, and the accommodation space is formed to be a cylindrical space with a curved surface as a side. Of course, it should be understood that the portion of the fixing member 40 arranged in the accommodation space 31 is not limited to only have the cylindrical structure, may be in any structure form as long as the shape and size of the accommodation space 31 are matched with the shape and size of the portion of the fixing member 40 arranged in the accommodation space 31.

Optionally, in a case that the portion of the fixing member 40 arranged in the accommodation space 31 is inserted into the accommodation space 31, the first buffer material layer 30 is tightly matched with and connected to the fixing member 40 so that the first buffer material layer 30 tightly covers around the fixing member 40, achieving better vibration damping effect.

Additionally, the first support 10 includes a first curved portion 11, the second support 20 includes a second curved portion 21 arranged opposite to the first curved portion 11, and the first curved portion 11 and the second curved portion 21 each is arranged around the accommodation space 31 so that the fixing member 40 arranged in the accommodation space 31 is firmly fixed between the first curved portion 11 and the second curved portion 21.

Referring to FIG. 4, in the embodiment of the present disclosure, the terminal mounting support further includes a second buffer material layer 50 arranged on a side of the second support 20 away from the first support 10, and one side of the second buffer material layer 50 is fixedly connected to the second support 20, and the other side of the second buffer material layer 50 is provided with a positioning mounting surface 51 attached to the terminal 100. The positioning mounting surface 51 may be a plane surface or may also be a curved surface. Optionally, the positioning mounting surface 51 may be designed according to the shape of the terminal 100. In a case that the surface of the terminal 100 contacting with the positioning mounting surface 51 is a plane surface, the positioning mounting surface 51 may be designed to be a plane surface, and the entire positioning mounting surface 51 is connected to the terminal 100 to increase the contact area of contacting with the terminal 100, effectively relieving vibration.

As shown in FIG. 2 to FIG. 4, in a case that the terminal 100 is fixedly connected to the fixing member 40, the first support 10, the second support 20 and the first buffer material layer 30 are fixedly connected to the fixing member 40, then the second buffer material layer 50 is attached to the second support 20, the terminal 100 is attached to the positioning mounting surface 51 of the second buffer material layer 50, and the terminal mounting support is connected to the terminal 100 using the connection structures arranged on the first support 10 and/or the second support 20 to fix the terminal 100 onto the fixing member 40. The anti-vibration buffering effect of the terminal mounting support can be further improved by arranging the second buffer material layer 50 between the second support 20 and the terminal 100.

In addition, in conjunction with FIG. 2 and FIG. 4, in an embodiment of the present disclosure, the first buffer material layer 30 may be arranged in a part of the space between the first support 10 and the second support 20, or may also be arranged on the entire space between the first support 10 and the second support 20. Specifically, the first support 10 further includes a first flat plate portion 12 and a second flat plate portion 13 respectively extending from two sides of the first curved portion 11, a third flat plate portion 14 connected to the first flat plate portion 12, and a fourth flat plate portion 15 connected to the second flat plate portion 13. The first flat plate portion 12 and the second flat plate portion 13 are symmetrical with respect to the first curved portion 11, and the third flat plate portion 14 and the fourth flat plate portion 15 are arranged along the same plane and respectively located in different planes from the first flat plate portion 12 and the second flat plate portion 13, and an included angle is formed with the first flat plate portion 12 and the second flat plate portion 13. In this way, the first support 10 has a ∨ shape.

In addition, the second support 20 further includes a fifth flat plate portion 22 and a sixth flat plate portion 23 extending respectively from two sides of the second curved portion 21, a seventh flat plate portion 24 connected to the fifth flat plate portion 22, and an eighth flat plate portion 25 connected to the sixth flat plate portion 23. The fifth flat plate portion 22 and the sixth flat plate portion 23 are symmetrical with respect to the second curved portion 21, and the seventh flat plate portion 24 and the eighth plate portion 25 are arranged along the same plane and respectively located in different planes from the fifth plate portion 22 and the sixth plate portion 23, and an included angle is formed with the fifth plate portion 22 and the sixth plate portion 23. In this way, the second support has a ∨ shape.

Additionally, in a case that the first support 10 is connected to the second support 20, in an embodiment of the present disclosure, the first flat plate portion 12 is parallel to the fifth plate portion 22, and the second flat plate portion 13 is parallel to the sixth plate portion 23. The first buffer material layer 30 is arranged between the first flat plate portion 12 and the fifth plate portion 22 and between the second flat plate portion 13 and the sixth plate portion 23. Optionally, there are gaps between the third flat plate portion 14 and the seventh flat plate portion 24 and between the fourth flat plate portion 15 and the eighth plate portion 25, and the first buffer material layer 30 is arranged in the gaps. In such structure, the first buffer material layer 30 is arranged in the entire space between the first support 10 and the second support 20, achieving the best anti-vibration buffering effect.

Further, in an embodiment of the present disclosure, the first buffer material layer 30 is provided with a first mounting hole communicating with the accommodation space, and the first curved portion 11 of the first support 10 is provided with a second mounting hole 111 corresponding to the first mounting hole. The first mounting hole and the second mounting hole 111 each is provided with screw threads, the first mounting hole and the second mounting hole 111 are connected using a screw, and thus the first support 10 is fixedly connected to the fixing member 40. Additionally, in an embodiment of the present disclosure, the third flat plate portion 14 of the first support 10 and the seventh flat plate portion 24 of the second support 20 each is provided with at least one third mounting hole 222 for the penetration of a screw, and the fourth flat plate portion 15 of the first support 10 and the eighth flat plate portion 25 of the second support 20 each is provided with at least one third mounting hole 222 for the penetration of a screw. The first support 10 and the second support 20 are fixedly connected to the terminal by passing a screw through the third mounting hole 222 and connecting the screw to the fixed terminal. Hence, the third mounting hole 222 is formed to be the connection structure for connecting the first support 10 and the second support 20 to the terminal. Further, as shown in FIG. 4, in a case that a projection of the third mounting hole 222 on the plane where the second buffer material layer 50 is located is on the second buffer material layer 50, the second buffer material layer 50 is provided with a mounting hole corresponding to the third mounting hole 222 which is used for passing a screw through the second buffer material layer 50 and fixedly connecting the screw to the terminal.

The number of the third mounting hole 222 is at least two. Additionally, it should be understood that the connection structure for connecting the first support 10 and the second support 20 to the terminal is not limited to be implemented with the structure described above, and other connection structures may be used by those skilled in the art according to the principle of the present disclosure.

In addition, in conjunction with FIG. 2 and FIG. 4, the connection structure includes a first protrusion 200 arranged on an end surface of the second support 20 facing the first support 10. Optionally, a protrusion 200 on the first flat plate portion 12 of the first support 10 is perpendicular to the first flat plate portion 12, and a protrusion 200 on the second flat plate portion 13 of the first support 10 is perpendicular to the second flat plate portion 13. The first buffer material layer 30 and the first support 10 each is provided with a via hole corresponding to the first protrusion 200 so that the protrusion 200 penetrates the first buffer material layer 30 and the first support 10 through the via hole.

The first portion of the first protrusion 200 sequentially passes through the via hole of the first buffer material layer 30 and the via hole of the first support 10, passes through the first support 10 and is fixedly connected to the first support 10. In this way, the second support 20 is fixedly connected to the first support 10 by arranging the first protrusion 200 which penetrates the first support 10 on second support 20.

In some embodiments of the present disclosure, referring to FIG. 2, a second protrusion 300 is arranged on an end surface of the first support 10 away from the second support 20, and a first portion of the first protrusion 200 is connected to the second protrusion 300 using a screw to fixedly connect the first protrusion 200 to the first support 10. Optionally, both the number of the first protrusion 200 arranged on the second support 20 and the number of the second protrusion 300 arranged on the first support 10 are at least two to ensure the firm connection between the first support 10 and the second support 20.

In some embodiments of the present disclosure, as shown in FIG. 2, the number of the second protrusion 300 is two, and the two second protrusion 300s are respectively arranged on two sides of the first curved portion 11. One of the second protrusions 300 is located on the first flat plate portion 12 and the third flat plate portion 14, and is perpendicular to the second flat plate portion 13 and the fourth flat plate portion 15; the other of the second protrusions 300 is located on the second flat plate portion 13 and the fourth flat plate portion 15, and is perpendicular to the first flat plate portion 12 and the third flat plate portion 14. In some embodiments of the present disclosure, the first buffer material layer 30 and the second buffer material layer 50 each is made of a silica gel material. Additionally, as shown in FIG. 4, in a case that the first buffer material layer 30 is arranged as a whole, the first buffer material layer 30 is further provided with a notch 32 extending from the first end surface to the second end surface, and the notch 32 communicates with the accommodation space 31. The first buffer material layer 30 may be deformed with the notch 32, and the opening of the notch 32 is increased so that the first buffer material layer 30 can be sheathed on the fixing member.

Preferably, the first support 10 and the second support 20 with the above-described structure are made by means of the sheet metal bending process or the compression casting process.

In a case that the terminal mounting support with the above-described structure according to the embodiments of the present disclosure is used, in conjunction with FIG. 2 and FIG. 4, the specific steps of mounting the terminal onto the fixing member includes:

arranging a via hole on the fixing member 40, which corresponds to the first mounting hole on the first buffer material layer 30 and the second mounting hole 111 on the first support 10;

sheathing the first buffer material layer 30 on the fixing member 40, and controlling the first mounting hole on the first buffer material layer 30 to correspond to the via hole of the fixing member 40;

fitly connecting the first support 10 to the second support 20, arranging the first buffer material layer 30 between the first support 10 and the second support 20, controlling the first protrusion 200 to pass through the first buffer material layer 30 and the first support 10 and connecting the first protrusion 200 to the second protrusion 300 on the first support 10 using a screw to achieve the fixed connection between the first support 10 and the second support 20;

passing a screw through the second mounting hole 111 on the first support 10 to fix the first support 10 onto the fixing member 40;

fixedly connecting the second support 20 onto a side of the second buffer material layer 50; and attaching the terminal 100 to be fixed onto the positioning mounting surface 51 of the second buffer material layer 50, passing a screw through the third mounting hole 222, and controlling the screw to penetrates into a screw hole corresponding to the terminal 100 to fix the terminal 100 onto the fixing member 40.

The terminal mounting support with the above-described structure includes two supports and two buffer material layers, not only the buffer material layer covers around the periphery of the fixing member, but also the buffer material layer is arranged on the portion of the mounting support which is contacted with the terminal. Therefore, the area where the buffer material layer is arranged is increased, the vibration force generated when the fixing member is vibrated is effectively decomposed and absorbed, the vibration force transmitted to the terminal is weakened, and the vibration damping effect is achieved to protect the fixed terminal.

The forgoing descriptions are only the optional embodiments of the present present disclosure, and it should be noted that numerous improvements and modifications made to the present disclosure can further be made by those skilled in the art without being departing from the principle of the present disclosure, and those improvements and modifications shall fall into the scope of protection of the present disclosure.

What is claimed is:

1. A terminal mounting support, adapted to fix a terminal onto a fixing member, comprising:

a first support and a second support oppositely arranged, wherein the first support is fixedly connected to the second support, and at least one of the first support and the second support is provided with a connection structure capable of being fixedly connected to the terminal;

a first buffer material layer arranged between the first support and the second support, wherein an accommodation space for accommodating at least a portion of the fixing member is in the first buffer material layer; and a second buffer material layer on a side of the second support facing away from the first support, wherein a surface of the second buffer material layer facing away from the second support is a positioning mounting surface to be attached to the terminal, and the second buffer material layer is made of a silica gel material;

wherein the first support comprises a first curved portion, the second support comprises a second curved portion opposite to the first curved portion, and the first curved portion and the second curved portion each is around the accommodation space, the first support further comprises a first flat plate portion and a second flat plate portion respectively extending from two sides of the first curved portion, a third flat plate portion connected to the first flat plate portion, and a fourth flat plate portion connected to the second flat plate portion, the third flat plate portion and the fourth flat plate portion are arranged along a same plane and respectively located in planes different from the first flat plate portion and the second flat plate portion, an angle is formed between the first flat plate portion and the second flat plate portion, the second support further comprises a fifth flat plate portion and a sixth flat plate portion extending respectively from two sides of the second curved portion, a seventh flat plate portion connected to the fifth flat plate portion, and an eighth flat plate portion connected to the sixth flat plate portion, the seventh flat plate portion and the eighth flat plate portion are arranged along a same plane and respectively located in planes different from the fifth flat plate portion and the sixth flat plate portion, an angle is formed between the fifth flat plate portion and the sixth flat plate portion, and at least two second protrusions are arranged on surfaces of the first support facing away from the second support, a first one of the at least two second protrusions is fixed onto the surfaces of the first flat plate portion and the third flat plate portion of the first support, and a second one of the at least two second protrusions is fixed onto the surfaces of the second flat plate portion and the fourth flat plate portion of the first support.

2. The terminal mounting support according to claim 1, wherein the accommodation space penetrates a first end surface and a second end surface of the first buffer material layer opposite to each other.

3. The terminal mounting support according to claim 2, wherein a shape and a size of the accommodation space are matched with a shape and a size of the portion of the fixing member arranged in the accommodation space respectively, to enable the fixing member to be tightly held in the accommodation space.

4. The terminal mounting support according to claim 1, wherein the accommodation space is of a cylindrical shape.

5. The terminal mounting support according to claim 1, wherein the first buffer material layer is provided with a first mounting hole communicating with the accommodation space, and the first support is provided with a second mounting hole corresponding to the first mounting hole, and the first mounting hole and the second mounting hole are connected through a first screw.

6. The terminal mounting support according to claim 1, wherein the connection structure comprises a first protrusion arranged on a surface of the second support facing the first support, and the first buffer material layer and the first support each is provided with a via hole matched with the first protrusion; and
wherein a first portion of the first protrusion sequentially passes through the via hole of the first buffer material layer and the via hole of the first support, extends out of the first support and is fixedly connected to the first support.

7. The terminal mounting support according to claim 6, wherein each of the at least two second protrusions are connected to the first portion of the corresponding first protrusion using a second screw to fixedly connect the first support to the second support.

8. The terminal mounting support according to claim 1, wherein the first support, the second support and the first buffer material layer each is provided with a third mounting hole into which a screw is threaded, and the connection structure further comprises a third screw penetrating the first support, the second support and the first buffer material layer, and connected to the third mounting hole.

9. The terminal mounting support according to claim 2, wherein the first buffer material layer is further provided with a notch extending from the first end surface to the second end surface, and the notch communicates with the accommodation space.

10. The terminal mounting support according to claim 1, wherein the first flat plate portion and the second flat plate portion are symmetrical with respect to the first curved portion.

11. The terminal mounting support according to claim 1, wherein the fifth flat plate portion and the sixth flat plate portion are symmetrical with respect to the second curved portion.

12. The terminal mounting support according to claim 1, wherein the at least two second protrusions are perpendicular to the surfaces of the first flat plate portion, the second flat plate portion, the third flat plate portion and the fourth flat plate portion of the first support.

13. The terminal mounting support according to claim 1, wherein the first buffer material layer is made of a silica gel material.

14. The terminal mounting support according to claim 7, wherein the first support and the second support each is made by means of the sheet metal bending process.

15. The terminal mounting support according to claim 1, wherein the positioning mounting surface is a flat surface.

16. The terminal mounting support according to claim 1, wherein the second buffer material layer comprises a protruding portion, a first flat portion, and a second flat portion, and the protruding portion is between the first flat portion and the second flat portion.

17. The terminal mounting support according to claim 10, wherein the first buffer material layer is filled between the first flat plate portion and the fifth flat plate portion, between the third flat plate portion and the seventh flat plate portion, between the first curved portion and the second curved portion, between the second flat plate portion and the sixth flat plate portion, and between the fourth flat plate portion and the eighth flat plate portion.

18. The terminal mounting support according to claim 1, wherein the second buffer material layer is filled between a surface of the terminal attached to the positioning mounting surface and the fifth to the eighth flat plate portions of the second support, and between the surface of the terminal and the second curved portion of the second support.

19. The terminal mounting support according to claim 15, wherein a cross section of the first support perpendicular to the positioning mounting surface has a 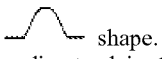 shape.

20. The terminal mounting support according to claim 15, wherein a cross section of the second support perpendicular to the positioning mounting surface has a 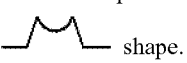 shape.

* * * * *